US008587171B2

(12) United States Patent
Kim

(10) Patent No.: US 8,587,171 B2
(45) Date of Patent: Nov. 19, 2013

(54) BEARING STRUCTURE AND SPINDLE MOTOR HAVING THE SAME

(75) Inventor: Chanseok Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 411 days.

(21) Appl. No.: 12/870,049

(22) Filed: Aug. 27, 2010

(65) Prior Publication Data
US 2011/0050050 A1    Mar. 3, 2011

(30) Foreign Application Priority Data

Aug. 28, 2009   (KR) .................. 10-2009-0080540

(51) Int. Cl.
*H02K 5/16* (2006.01)
*F16C 32/06* (2006.01)

(52) U.S. Cl.
USPC ............. 310/90; 310/425; 384/265; 384/114; 384/428

(58) Field of Classification Search
USPC ................. 310/90, 425; 384/265, 114, 428
See application file for complete search history.

(56) References Cited

U.S. PATENT DOCUMENTS

| | | | |
|---|---|---|---|
| 2,796,305 A * | 6/1957 | Grey ............................. | 384/425 |
| 4,531,419 A * | 7/1985 | Botz et al. ................. | 74/388 PS |
| 4,601,590 A * | 7/1986 | Arii et al. ......................... | 384/99 |
| 4,726,694 A * | 2/1988 | McFarlin et al. ............. | 384/119 |
| 5,628,569 A * | 5/1997 | Hayakawa et al. ........... | 384/278 |
| 5,725,314 A * | 3/1998 | Fannar ........................... | 384/118 |
| 7,579,741 B2 * | 8/2009 | Morikaku et al. ........... | 310/239 |
| 7,699,527 B2 * | 4/2010 | Komori et al. ................ | 384/100 |
| 8,179,006 B2 * | 5/2012 | Smirnov ......................... | 310/90 |
| 2002/0096953 A1 * | 7/2002 | Shingai et al. ................. | 310/90 |
| 2005/0046292 A1 * | 3/2005 | Campbell et al. .............. | 310/90 |
| 2005/0121988 A1 * | 6/2005 | Howe et al. .................... | 310/90 |
| 2006/0087184 A1 * | 4/2006 | Kuyama et al. ................ | 310/90 |
| 2007/0007836 A1 * | 1/2007 | Hyun .............................. | 310/90 |
| 2007/0096572 A1 * | 5/2007 | Watkins et al. ................ | 310/90 |
| 2007/0172159 A1 * | 7/2007 | Komori et al. ................ | 384/100 |
| 2008/0088187 A1 * | 4/2008 | Shao et al. ..................... | 310/51 |
| 2009/0115276 A1 * | 5/2009 | Kodama ......................... | 310/90 |
| 2009/0224618 A1 * | 9/2009 | Bhatti ............................ | 310/90 |
| 2010/0021102 A1 * | 1/2010 | Fukumura et al. ............ | 384/589 |
| 2010/0054965 A1 * | 3/2010 | Teshima et al. ............... | 417/354 |

FOREIGN PATENT DOCUMENTS

| | | | |
|---|---|---|---|
| EP | 404738 A2 | * | 12/1990 |
| JP | 06054478 A | * | 2/1994 |
| JP | 07243449 A | * | 9/1995 |
| JP | 08074867 A | * | 3/1996 |
| JP | 10201167 A | * | 7/1998 |

(Continued)

OTHER PUBLICATIONS

Translation of foreign document JP 07243449.*

(Continued)

*Primary Examiner* — Tran Nguyen
*Assistant Examiner* — Alex W Mok
(74) *Attorney, Agent, or Firm* — Saliwanchik, Lloyd & Eisenschenk

(57) ABSTRACT

A spindle motor is disclosed, wherein the spindle motor includes a bearing housing coupled to the base plate, a bearing disposed in the bearing housing, and a rotating shaft inserted into the bearing to rotatably support to the bearing, a portion of bearing protruded from a circumferential face of the bearing is press-fitted into an inner face of the bearing housing.

14 Claims, 5 Drawing Sheets
(3 of 5 Drawing Sheet(s) Filed in Color)

(56) References Cited

FOREIGN PATENT DOCUMENTS

| | | | | |
|---|---|---|---|---|
| JP | 10285861 | A | * | 10/1998 |
| JP | 2004263710 | A | * | 9/2004 |
| JP | 2005198422 | A | * | 7/2005 |
| JP | 2008162359 | A | * | 7/2008 |
| KR | 20-0406838 | Y1 | | 1/2006 |
| KR | 10-2009-0086709 | A | | 8/2009 |

OTHER PUBLICATIONS

Office Action dated Jan. 6, 2011 in Korean Application No. 10-2009-0080540, filed Aug. 28, 2009.

* cited by examiner

BEARING STRUCTURE AND SPINDLE MOTOR HAVING THE SAME

CROSS-REFERENCE TO RELATED APPLICATION

This application claims the benefit under 35 U.S.C. §119 of Korean Application Number 10-2009-0080540, filed Aug. 28, 2009, which is hereby incorporated by reference in its entirety.

BACKGROUND

1. Field of the Invention

The present invention relates to a bearing structure and a spindle motor having the same.

2. Description of Related Art

Generally, a spindle motor includes a rotating shaft that is rotatably supported by a bearing disposed in a bearing housing, a rotator, which is coupled to the rotating shaft, including a magnet, a stator having a coil providing a magnet field to the magnet of the rotator, and a base plate combined with the bearing housing.

Generally, the bearing is press-fitted into the bearing housing, and in a case the bearing is press-fitted into the bearing housing, a large compression stress is applied to the bearing so that a bearing is contracted by the compression stress. Thus a size of the bearing that is press-fitted into the bearing housing is smaller than that of an initial bearing that is not press-fitted into the bearing housing.

Especially, an inner diameter of the bearing press-fitted into the bearing housing is smaller than that of the initial bearing by the compression stress generated while the bearing is press-fitted into the bearing housing. After the bearing is press-fitted into the bearing housing, a gap formed between a circumferential face of the rotating shaft inserted into the bearing and an inner face of the bearing is narrowed whereby a rotating characteristic of the spindle motor is greatly reduced.

In order to prevent decreased rotating characteristic of the spindle motor, the inner diameter of the bearing is expanded by using a resizing process to adjust the gap formed between the rotating shaft and the bearing, after the bearing is press-fitted into the bearing housing, However, in a case the inner diameter is expanded by the resizing process after the bearing is press-fitted into the bearing housing, a time and a number of processes for manufacturing the spindle motor are increased. Also, even if the inner diameter is expanded by the resizing process, the gap formed between the rotating shaft and the bearing housing may be incorrect.

BRIEF SUMMARY

The present disclosure is to provide a bearing structure and a spindle motor having the same configured to prevent a contraction of an inner face of bearing for press-fitting the bearing into the bearing housing.

According to one aspect of the present disclosure, the object described above may be achieved by a spindle motor, comprising: a bearing housing coupled to the base plate; a bearing disposed in the bearing housing; and a rotating shaft inserted into the bearing to rotatably support to the bearing, wherein a portion of bearing protruded from a circumferential face of the bearing is press-fitted into an inner face of the bearing housing.

According to another aspect of the present invention, the object described above may be achieved by a spindle motor, comprising: a bearing housing coupled to the base plate; a bearing disposed in the bearing housing; a rotating shaft inserted into the bearing to rotatably support to the bearing; a convex portion protruded from a portion of circumferential face of bearing or a portion of an inner face of the of the bearing housing;

a concave portion recessed from a portion corresponding to the convex portion of the bearing or bearing housing, wherein the convex portion is press-fitted into the concave portion so that the convex portion is coupled to the bearing housing.

According to still another aspect of the present invention, the object described above may be achieved by a spindle motor, comprising: a rotating shaft; a bearing rotatably supporting the rotating shaft, and including a convex portion formed at a portion of a circumferential face of the bearing; and a bearing housing receiving the convex portion of bearing, the bearing housing including a concave portion press-fitted into two side faces of the convex portion, and the concave portion spaced apart from an upper face that is perpendicular to the two side faces of the convex portion.

According to still another aspect of the present invention, the object described above may be achieved by a bearing structure, comprising: a bearing for rotatably supporting a rotating shaft; a bearing housing receiving the bearing and supporting a circumferential face of the bearing; and a contraction preventing portion for inhibiting contraction of an inner face which is opposite to the circumferential face of bearing while the bearing is press-fitted into the bearing housing.

According to still another aspect of the present invention, the object described above may be achieved by a bearing structure, comprising: a bearing rotatably supporting a rotating shaft and the bearing including a convex portion protruded from a portion of circumferential face of the bearing; and a bearing housing receiving the bearing, the bearing housing including a concave portion press-fitted into the two side faces of the convex portion and the concave portion spaced apart from an upper face that is perpendicular to the side faces of the convex portion.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION

Figure 1:
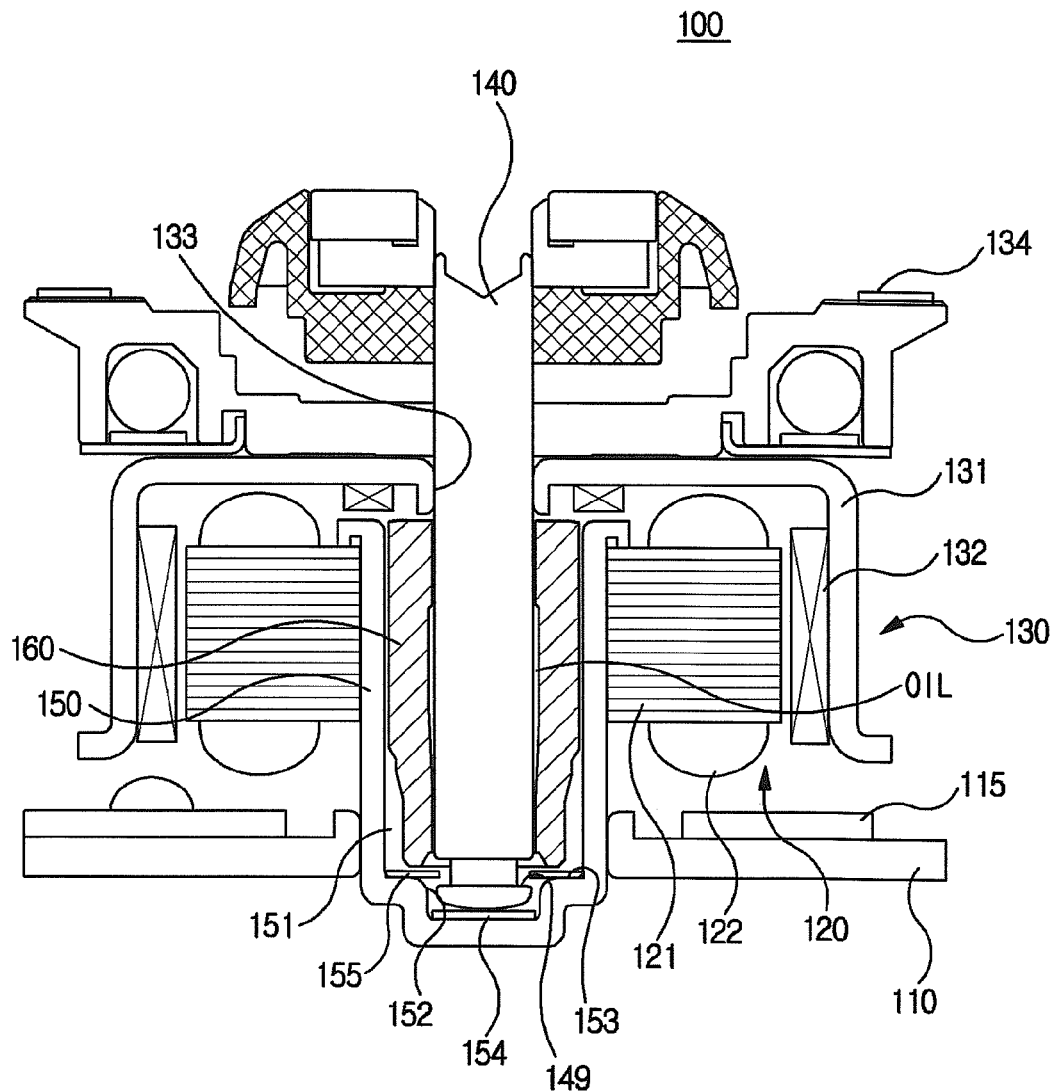
FIG. 1 is a cross-sectional view illustrating a spindle motor according to an embodiment of the present invention.

FIG. 1 is a cross-sectional view illustrating a spindle motor according to an embodiment of the present invention.

Referring to FIG. 1, the spindle motor 100 includes a base plate 110, a stator 120, a rotor 130, a rotating shaft 140, and a bearing structure. The bearing structure has a bearing 160 and a bearing housing 150.

The base plate 110 has a circuit board 115 and the circuit board 115 is disposed on an upper face of the base plate 110. The base plate 110 has a through-hole passing through the upper face and a lower face opposite to the upper face.

The bearing housing 150 of the bearing structure is coupled to the base plate 110 using the through-hole formed therethrough.

The stator 120 is combined with a circumferential face of the bearing housing 150, the rotor 130 is coupled to a circumferential face of the rotating shaft 140. The rotating shaft 140 is rotatably supported to the bearing 160 disposed in the bearing housing 150.

The stator 120 includes a core 121 fixed to the circumferential face of the bearing housing 150 and a coil 122 wounded around the core 121.

The rotor 130 includes a rotor yoke 131 coupled to the rotating shaft 140 and a magnet 132 formed on an inner face of the rotor yoke 131. The magnet 132 is opposite to the core 121.

A central portion of the rotor yoke 131 has a through-hole 133 for coupling to the rotating shaft 140 by a press-fitting process. A turn-table 134 for mounting an optical disc is disposed on an upper face of the rotor yoke 131.

In a case an electrical current is applied to the coil 122 of the stator 120, a magnetic field is generated from the coil 122.

The rotating shaft 140 and the rotor 130 coupled to the rotating shaft 140 are rotated by a rotational force generated between the magnetic filed generated from the coil 122 and a magnetic field generated from the magnet 132.

The bearing housing 150 has a bearing receiving portion 151 and a thrust plate receiving portion 152. The bearing 160 is disposed in the bearing receiving portion 151 and a thrust plate 154 is disposed in the thrust plate receiving portion 152.

The trust plate 154 reduces a friction force generated between an end portion of the rotating shaft 140 and the trust plate 154 and the trust plate 154 supports a vertical load of the rotating shaft 140. The trust plate 154 is interposed between the end portion of the rotating shaft 140 and a portion of bearing housing 150 which is opposite to the end portion of the rotating shaft 140.

An area of the thrust plate receiving portion 152 is smaller than that of the bearing receiving portion 151. A stopper portion 153 formed between the thrust plate receiving portion 152 and the bearing receiving portion 150. A stopper 155 having a washer shape is disposed on the stopper portion 153. The stopper 155 prevents the bearing 160 from being lifted from the rotating shaft 140. The stopper 155 takes a groove 149 formed on the circumferential face of the rotating shaft 140 to suppress the lifting of the rotating shaft 140.

The rotating shaft 160 is inserted into an inner face of the bearing 160. A fine gap is formed between the inner face of the bearing 160 and the circumferential face of the rotating shaft 140 and a lubricant is formed therebetween.

Figure 2:
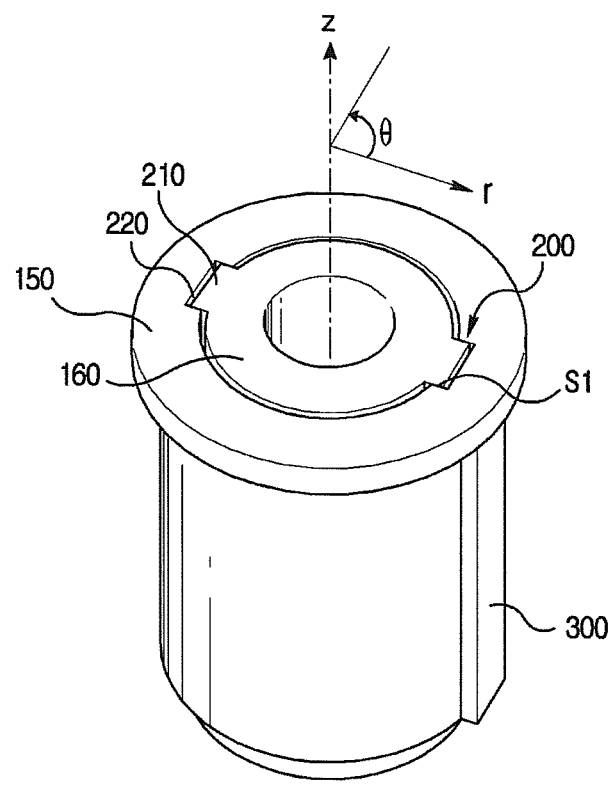
FIG. 2 is a perspective view illustrating the bearing and the bearing housing according to one embodiment of the present invention.
Figure 3:
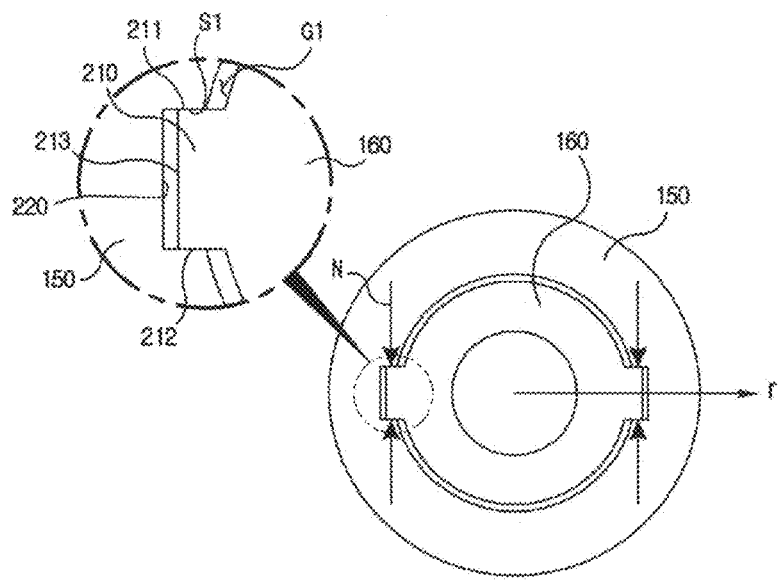
FIG. 3 is a plane view illustrating the bearing assembled with the bearing housing in FIG. 1.

FIG. 2 is a perspective view illustrating the bearing and the bearing housing according to one embodiment of the present invention. FIG. 3 is a plane view illustrating the bearing assembled with the bearing housing in FIG. 1.

Referring to FIG. 2, a bearing 160 is indicated by a cylindrical coordinate system in this exemplary embodiment of the present invention.

The bearing 160 has a cylinder shape having a hollow hole. A radial direction of the bearing 160 is represented by "r axis", a tangential direction of the bearing 160 is represented by "θ axis", and a lengthwise direction of the bearing 160 is represented by "z axis" in FIG. 2.

In this exemplary embodiment of the present invention, a portion of the bearing 160 is press-fitted into the inner face of the bearing housing 150. The bearing 160 has a contraction preventing portion 200. The contraction preventing portion 200 inhibits contraction of the inner face of the bearing 160, which is opposite to the circumferential face of the rotating shaft 140, from being contracted by a compression force generated while the bearing 160 is press-fitted into the bearing housing 150.

The contraction preventing portion 200 includes a convex portion 210 and the concave portion 220.

The convex portion 210 or the concave portion 220 is partially formed on the circumferential face of the bearing 160 or the inner face of the bearing housing 160.

The convex portion 210 is press-fitted into the concave portion 220 so that the bearing 160 is combined with the bearing housing 150. In a case the convex portion 210 is press-fitted into the concave portion 220, the compression force is not directly applied to the circumferential face of bearing 160 because the circumferential face of bearing 160 not directly contact the inner face of the bearing housing 150.

That is, in a case a whole circumferential face of the bearing 160 is press-fitted into the bearing housing 150, the inner face of the bearing 160 may be contracted by the compression force formed therebetween.

However, in a case the bearing 160 is press-fitted into the bearing housing 150 using the convex portion 210 partially formed on the circumferential face of the bearing 160 and the concave portion 220 partially formed on the bearing housing 210, the contraction of the inner diameter of the bearing 160 is suppressed by the contraction preventing portion 200.

Also, in a case the bearing 160 is press-fitted into the bearing housing 150 using the contraction preventing portion 200, the inner diameter of the bearing 160 is not changed during the press-fitting process and it is not require to expand the inner face of the bearing 160 using a resizing process.

In this exemplary embodiment of the present invention, the convex portion 210 is partially protruded from the circumferential face of the bearing 160 or bearing housing 150. The concave portion 220 is partially recessed from the circumferential face of the bearing 160 or bearing housing 150.

The convex portion 210 that is protruded from the circumferential face of the bearing 160 has a predetermined width and the concave portion 220 has a predetermined width. The width of the convex portion 210 is substantially larger than the width of the concave portion 220 for press-fitting the convex portion 210 into the concave portion 220.

The convex portion 210 has then a predetermined thickness and the concave portion 220 has a predetermined depth. The thickness of the convex portion 210 is substantially smaller than the depth of the concave portion 220 so that an upper face of the convex portion 210 does not directly contact an inner face of the concave portion 220.

In FIGS. 2 to 7, the convex portion 210 may be partially formed on the circumferential face of the bearing 160 and the concave portion 220 may be partially formed on the bearing housing 150. Alternatively, the convex portion 210 may be partially formed on the bearing housing 150 and the concave portion 220 may be partially formed on the bearing 160.

In a case the convex portion 210 is press-fitted into the concave portion 220, a pair of press-fitted faces S1 are formed between a pair of side faces of convex portion 210 and a pair of side faces of the concave portion 220. Thus, compression forces N are selectively applied to the press-fitted faces 51 based on a difference between the width of the convex portion 210 and the width of the concave portion 220. In a case the compression force N is not directly applied to the circumferential face of the bearing 160, the inner diameter of the bearing 160 may not be contracted by the bearing housing 150.

The compression force N applied to the press-fitted faces S1 formed between the convex portion 210 and the concave portion 220 is directed in a direction substantially perpendicular to the r axis. That is, a direction of the compression force N is perpendicular to the r axis and is parallel with the θ axis.

In this exemplary embodiment of the present invention, the convex portion 210 is protruded from the circumferential face of the bearing 160 toward the r axis and a height of the convex portion 210 is substantially identical to a height of the bearing 160 so that the convex portion 210 may have a rectangular column shape.

A first side face 211 of the convex portion 210 and a second side face 212 opposite to the first side face 211 are press-fitted into the concave portion 220. The first and second side faces 211 and 212 are parallel with the r axis and are perpendicular to the θ axis.

In exemplary embodiment of the present invention, the first and second side faces 211 and 212 are the press-fitted faces S1.

However, in a case a thickness of the convex portion 210 measured from the circumferential face of the bearing 160 is larger than a depth of the concave portion 220, the upper face 213 of the convex portion 210 which is perpendicular to the first and second side faces 211 and 212 is press-fitted into an bottom face, which faces with the upper face 213, of the concave portion 220 so that a compression force may be generated between the upper face 213 of the convex portion 210 and the bottom face of the concave portion 220 to contract the inner diameter of the bearing 160. Thus, in order to prevent the compression force generated between the upper face 213 and the bottom face from being contacting, the upper face 213 of the convex portion 210 and the bottom face of the concave portion 220 are not directly contacted to each other so that a press-fitted face is not formed therebetween.

In exemplary embodiment of the present invention, although the convex portion 210 has the rectangular column shape, a plurality of the convex portions 210, which have a cantilever shape, is intermittently protruded from the circumferential face of the bearing 160. A first side face and a second side face that is opposite to the first side face of the convex portion 210 having the cantilever shape are press-fitted into the concave portion 220.

Since the convex portion 210 of the bearing 160 is coupled to the concave portion 220 of the bearing housing 150, a space G1 is formed between the circumferential face of the bearing 160 and the inner face of the bearing housing 150. The compression force is not directly transmitted to the bearing 150 by the space G1 so that the contract of the bearing is inhibited.

An oil may be filled in the space G1 formed between the bearing housing 150 and the bearing 160 to increase a life of the bearing 160.

In a case a direction of the compression force N applied to the press-fitted face S1 is perpendicular to the r axis, the compression force N applied to the press-fitted face S1 is not transmitted to the circumferential face of the bearing 160.

In the exemplary embodiment of the present invention, only one convex portion 210 is formed on the circumferential face of the bearing 160, but at least two convex portions 210 are formed on the circumferential face of the bearing 160 having a same interval.

The bearing housing 150 is coupled to a through-hole of the core 121, the bearing housing 150 has a protrusion portion 300 formed on the circumferential face of the bearing housing 150 and the protrusion portion 300 is coupled to the through-hole of the core 121 to prevent the bearing housing 150 from rotating from the core 121.

In a case the spindle motor 100 is rotated with the disc, the bearing 160 is rotated by the bearing housing 150 or bearing housing 150 is rotated by the core 121 or base plate 110 based on a rotation torque of the spindle motor.

In exemplary embodiment of the present invention, bearing 160 and the bearing housing 150 are not rotated by the convex portion 210 of the bearing press-fitted into the concave portion 220 of the bearing housing 150. Also, the bearing housing 150 and the core 121 or the base plate 110 are not rotated by the protrusion portion 300 of the bearing housing 150.

Figure 4:
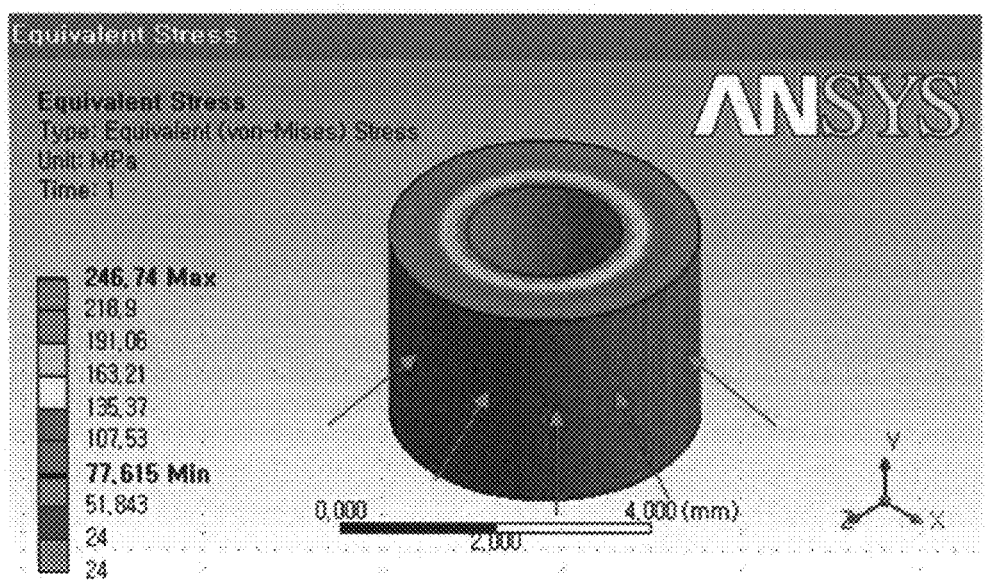
FIG. 4 is a perspective view illustrating a compression force of the bearing according to a relation art.
Figure 5:
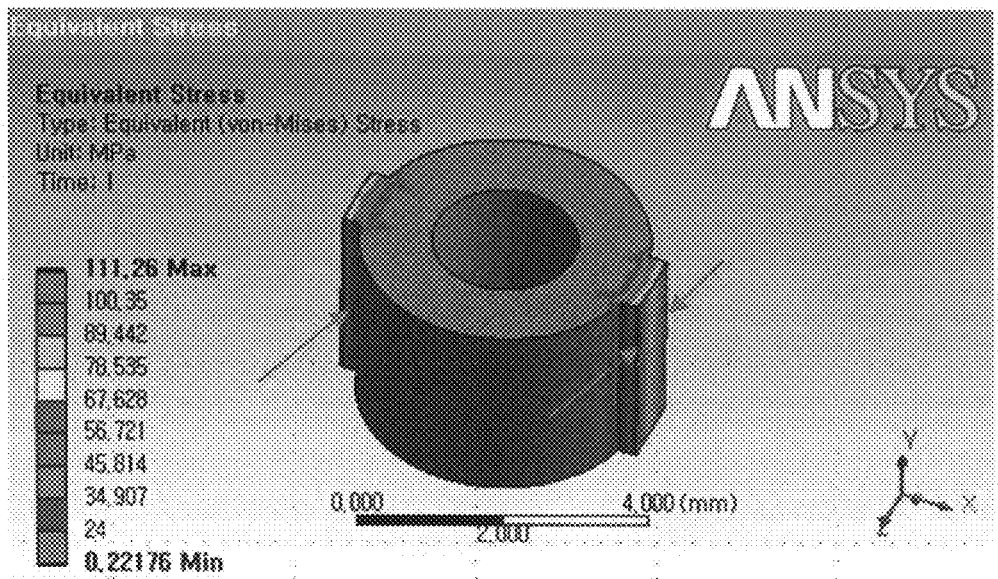
FIG. 5 is a perspective view illustrating a compression force of the bearing according to an exemplary embodiment of the present invention.

FIG. 4 is a perspective view illustrating a compression force of the bearing according to a relation art. FIG. 5 is a perspective view illustrating a compression force of the bearing according to an exemplary embodiment of the present invention. a compression force is represented by an arrow mark in FIG. 4. In FIGS. 4 and 5, each of the bearing tests under a same test conditions.

Referring to FIG. 4, a direction of the compression force of the bearing of the relation art is identical to the r axis so that a strength of the compression force is largest at the inner face of the bearing facing with the rotating shaft.

However, referring to FIG. 5, a direction of the compression force of the bearing of the present invention is perpendicular to the r axis so that the compression force is weakest at the inner face of the bearing as well as the circumferential face of the bearing. The most compression force of the bearing is applied to the first side face and the second side face of the convex portion that protruded from the circumferential face of the bearing.

Figure 6:
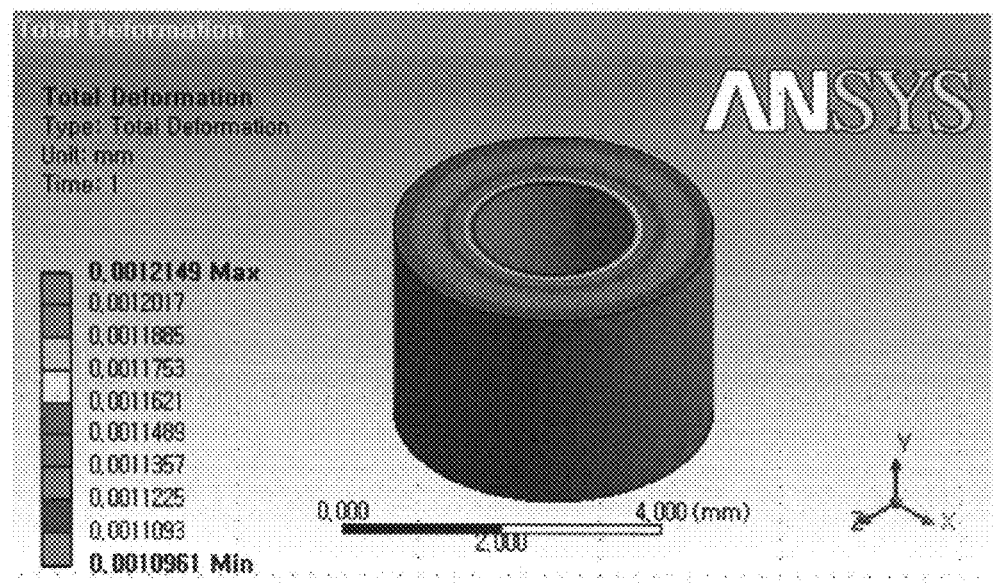
FIG. 6 is a perspective view illustrating a contraction ratio of the bearing according to the relation art.
Figure 7:
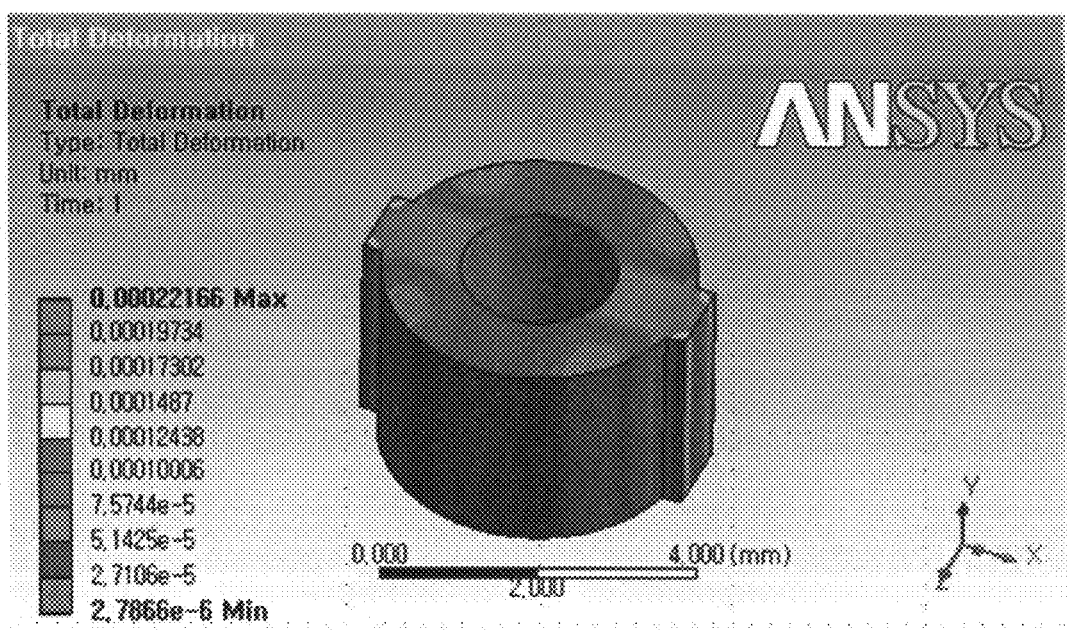
FIG. 7 is a perspective view illustrating a contraction ratio of the bearing according to an exemplary embodiment of the present invention

FIG. 6 is a perspective view illustrating a contraction ratio of the bearing according to the relation art. FIG. 7 is a perspective view illustrating a contraction ratio of the bearing according to an exemplary embodiment of the present invention. In FIGS. 6 and 7, each of the bearing tests under a same test conditions.

Referring to FIG. 6, the contraction ratio of the bearing is largest at the inner face of the bearing facing with the rotating shaft based on the compression force applied to the bearing.

However, Referring to FIG. 7, the contraction ratio of the bearing is smallest at the inner face of the bearing facing with the rotating shaft based on the compression force applied to the bearing.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:
1. A spindle motor, comprising:
a bearing housing coupled to a base plate;
a bearing disposed in the bearing housing; and
a rotating shaft inserted into the bearing to rotatably support the bearing, wherein a portion of bearing protruded from a circumferential face of the bearing is press-fitted into an inner face of the bearing housing, and wherein the protruding portion has a rectangular column shape and a space is formed between the protruding portion and the inner face of the bearing housing when the protruding portion is pressed into the inner face.

2. The spindle motor of claim 1, wherein the bearing includes a contraction preventing portion for inhibiting an inner face of bearing from being contracted by a compression force generated between the bearing and the bearing housing.

3. The spindle motor of claim 2, wherein the contraction preventing portion includes a convex portion protruded from a portion of circumferential face of the bearing or an inner face of the bearing housing, and a concave portion positioned to a portion corresponding to the convex portion of the bearing or bearing housing, wherein the convex portion is press-fitted into the concave portion so that the bearing is coupled to the bearing housing.

4. The spindle motor of claim 3, wherein the convex portion is protruded from a radial direction of the bearing and extended to a lengthwise direction.

5. The spindle motor of claim 3, wherein at least two convex portions are disposed on the circumferential face of bearing and the convex portions has a same interval.

6. The spindle motor of claim 3, wherein a direction of the compression force that is perpendicular to a press-fitted face contacting the convex portion and the concave portion is perpendicular to a radial direction of the bearing.

7. The spindle motor of claim 3, wherein a first side face and a second side face opposite to the first side face of the convex portion which are perpendicular to a direction of the compression force are press-fitted into the concave portion.

8. The spindle motor of clam 7, wherein an upper face that is perpendicular to the first and second side faces is spaced apart from the convex portion.

9. The spindle motor of claim 3, further comprising:
a core coupled to an circumferential face of bearing housing;
a coil wound around the core;
wherein the bearing housing is coupled to a through-hole formed at the core and bearing housing having a protrusion portion protruded from a circumferential face of the bearing housing and the protrusion portion is coupled to the through-hole.

10. A spindle motor, comprising:
a bearing housing coupled to a base plate;
a bearing disposed in the bearing housing;
a rotating shaft inserted into the bearing to rotatably support the bearing;
a convex portion protruded from a portion of circumferential face of bearing or a portion of an inner face of the of the bearing housing;
a concave portion recessed from a portion corresponding to the convex portion of the bearing or bearing housing,
wherein the convex portion is press-fitted into the concave portion so that the convex portion is coupled to the bearing housing, and
wherein the convex portion has a rectangular column shape and a space is formed between the convex portion and the inner face of the bearing housing when the convex portion is pressed into the inner face.

11. The spindle motor of claim 10, wherein a direction of the compression force that is perpendicular to a press-fitted face contacting the convex portion and concave portion is perpendicular to a radial direction of the bearing.

12. The spindle motor of claim 10, wherein a first side face and a second side face opposite to the first side face are press-fitted into the convex portion.

13. The spindle motor of claim 12, wherein an upper face that is perpendicular to the first and second side faces is spaced apart from the convex portion.

14. The spindle motor of claim 10, wherein a space is formed between a circumferential face of the bearing and an inner face of the bearing housing.

* * * * *